Figures 1, 2:
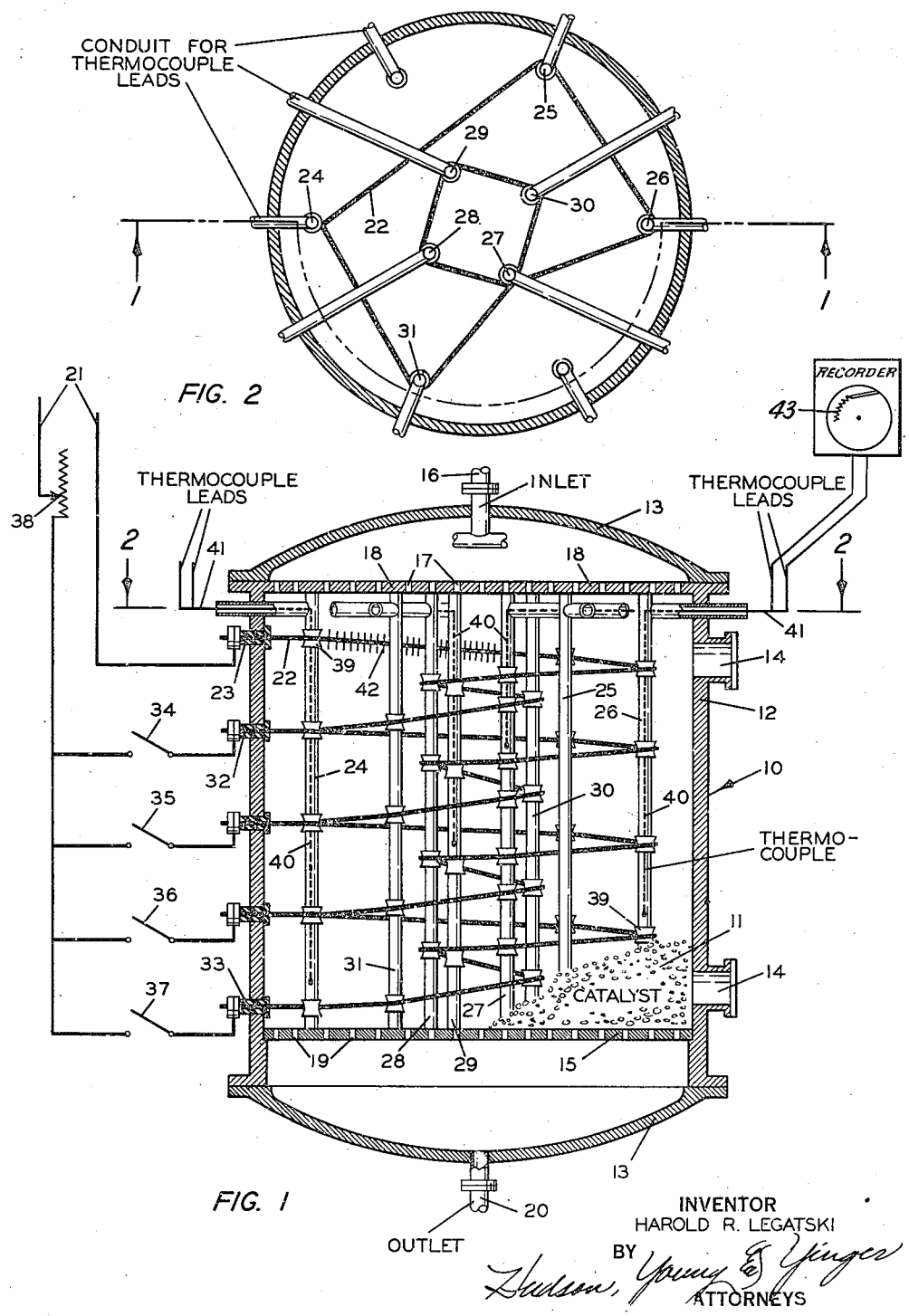

March 1, 1949. H. R. LEGATSKI 2,463,115
HEATED CATALYST CHAMBER
Filed March 17, 1942

INVENTOR
HAROLD R. LEGATSKI
BY
ATTORNEYS

Patented Mar. 1, 1949

2,463,115

UNITED STATES PATENT OFFICE 2,463,115

HEATED CATALYST CHAMBER

Harold R. Legatski, Bartlesville, Okla., assignor to Phillips Petroleum Company, a corporation of Delaware Application March 17, 1942, Serial No. 435,104

3 Claims. (Cl. 23—288)

This invention relates to catalyst chambers and more particularly it relates to an apparatus for the furnishing of heat to catalyst chambers.

It is well known that many chemical reactions are endothermic in nature. Dehydrogenation reactions, whether thermal or catalytic, are of this type and upon dehydrogenation or loss of hydrogen the reactants absorb heat from their surroundings. Thermal dehydrogenation obviously takes place in the presence of gases, and as the reaction proceeds heat from the surrounding gases is absorbed and their temperature is lowered. In the case of catalytic dehydrogenation the temperature of the catalyst as well as of the reacting gases is lowered. Due to the rather great temperature coefficient of the dehydrogenation reaction, upon continued catalytic reaction the catalyst is frequently cooled to a temperature below which it fails to promote the reaction to such an extent as to be economically impractical. Because of this adverse heat effect it is imperative that heat be added to the catalyst chamber in some manner if a reasonable reaction rate is to be maintained.

Various methods of accomplishing heat additions to catalysts have been proposed and used but these methods have proven to be costly and difficult to carry out. For example, the use of tubes, carrying superheated steam, hot flue gases or molten salts, imbedded in the catalyst has been suggested, as well as the employment of a vapor recycle between furnace and the catalyst chamber. Problems of control and operation presented by such cumbersome heating means are considerable and may be avoided or solved by the use of applicant's apparatus and method of operation as hereinafter fully described.

One object of this invention is to provide an apparatus for furnishing heat to catalytic chambers.

Another object of this invention is to provide an apparatus to furnish endothermic heat of dehydrogenation to dehydrogenation catalyst chambers, which apparatus is simple in construction and in operation.

Still another object of this invention is to provide an electrical apparatus to furnish endothermic heat of dehydrogenation to dehydrogenation catalyst chambers.

Still other objects and advantages will be apparent to those skilled in the art from a careful study of the following detailed disclosure.

To achieve these objects and others, I have devised an electrical heating apparatus which can be installed in and automatically or manually used in conjunction with a dehydrogenation catalyst chamber in order to prevent temperature reductions of the catalyst due to the endothermic heat of dehydrogenation reactions taking place therein.

The attached figures, which form a part of this specification, illustrate one embodiment of my invention in which Figure 1 represents a vertical section of a catalyst chamber equipped with my electrical heating apparatus with the front half of the chamber wall being removed, as on the line 1—1 of Figure 2.

Figure 2 represents a horizontal section of the catalyst chamber looking downward from the line 2—2 of Figure 1.

In the several figures, similar numerals designate corresponding or like parts.

Referring now to the figures, numeral 10 represents a catalyst chamber consisting of a cylindrical side wall 12 with rounded ends 13 attached thereto and containing catalyst 11. The chamber is equipped with covered manholes 14 for charging or discharging catalyst and for inspection purposes. In the bottom of said chamber is a base or support 15 for supporting the catalyst load, this base being perforated to permit the free flow of gases through the catalyst. Reactant gases enter the inlet end of the chamber through reactant vapor inlet 16, pass through perforations 17 in the support plate 18 into the catalyst 11, and leave the catalyst through the perforations 19 in base plate 15 and pass from the chambers through reaction vapor outlet 20.

A source of electric power, not shown, furnishes electricity for heating the catalyst bed, the electricity entering my system through power lines 21. An electrical heating element 22 enters the catalyst chamber through side wall 12, contact between the said heating element 22 and the chamber side wall 12 being prevented by insulator 23. The said heating element is wound around the element supports beginning at insulator 23, to supports 24, 25, 26, 27, 28, 29, 30, 27, 31 and to support 24 completing one cycle or coil of the said element. The end of this element is attached to the electrical lead in 32, which is then the beginning of a second cycle or coil of heating element. This heating coil is wound around the element supports in exactly the same manner as was the first coil above described. There are shown in the drawings four heating coils, but I do not wish to define my invention by this specific number of coils since the number will be determined by such conditions as height of the catalyst chamber, the reaction taking place, the amount of heat necessary to produce the desired temperature, and such other conditions as size and resistance of the heating wire, the available voltage, etc. The lead in 33 connects the lower end of the heating element to the source of current.

The several lead-ins are connected by switches 34, 35, 36, and 37 to the main circuit so that the length of the heating element within the catalyst chamber may be varied according to requirements. Beginning with all switches open, upon closing switch 34, current flows only in the upper heating coil, while if switch 35 alone is closed current flows in the upper two coils, and with only switch 36 closed current flows in the three coils while if switch 37 is closed with the others open, current flows through the entire heating circuit.

A voltage regulator 38 is inserted in the power line 21 in order that the amount of heating may be controlled according to that necessary to maintain the catalyst and reactants at the desired temperature.

The supports 24 and 31 inclusive are equipped with spool type insulators 39 to prevent short circuiting of the heating element 22. Figure 2 shows a plan view of these heating element supports carrying the coiled heating element. While I have shown the heating element coiled in the aforesaid manner, I do not wish to limit the arrangement of the vertical supports nor the form or extent of the said heating element because they may be arranged in various shapes and forms and yet serve the purpose of maintaining a predetermined temperature in the catalyst bed.

In order to control the temperature within the catalyst bed it has been found advantageous to measure the temperature thereof and preferably do so in a continuous manner, as by automatic and recording instruments. Accordingly I have installed thermocouples 40 in as many of the vertical supports 24—31 as necessary to give a reasonably true and accurate temperature measurement. The thermocouple lead wires 41 are attached to such recording instruments as recording potentiometers 43 or all temperatures may be recorded by one instrument, as by a "4-point" or "6-point," etc. instrument, not shown. This temperature recording instrument may then operate a control mechanism, not shown, for increasing or decreasing the voltage to the heating conductor as element 22 and/or opening or closing the switches 34—37 or an operator may control the voltage at 38 and operate switches 34 to 37 manually as he sees fit to maintain a predetermined temperature in the catalyst bed as set forth above, said temperature being clearly shown by the various recording potentiometers 43 which the operator may read and interpret.

The actual control instruments, mentioned herein, need not be fully described since such equipment is manufactured by recognized instrument and electrical manufacturers as standard equipment. Similarly, the electrical connections from member to member, as shown diagrammatically, need not be illustrated in detail for these methods are also well standardized and well understood by the workmen of the "instrument department" of refineries and chemical plants.

The electrical conductor or heating element 22 should be of material of high resistivity and resistance to oxidizing and reducing atmospheres at 1200°–1400° F. encountered during the catalytic operation or regeneration processes. I have found that such an alloy as that containing 18% chromium and 8% nickel serves well under these varying conditions. In order to increase the efficiency of said heating element it may be advantageous to equip said heating element with fins 42 to increase the transfer of heat from the element to the catalyst bed and to the gases undergoing dehydrogenation or other endothermic chemical reactions.

The size of the resistor element 22 may be different for different dehydrogenation or other endothermic processes for which it might be used, and its length and diameter may best be determined for each application by the amount of heat required, the distribution of such heat through the catalyst bed, strength of conductor and the safe watt-density limit. The heat transfer from the resistor to the reacting vapors and catalyst, as mentioned above, may be improved by use of projecting surfaces such as the fins 42 shown in the Figure 1.

By proper circuiting and sizing of resistors it will be possible to increase the temperature progressively as the catalyst becomes less active in order that the optimum reaction rate may be maintained.

The electric power supply to the heating element has been shown as a controllable voltage in order that the heat input to the full coil or any component section thereof may be controlled within desired limits.

Deposition of carbon on active catalyst during operation tends to short-circuit the heating coil progressively from top to bottom of the chamber. Such short circuiting serves the same purpose as the switches 34 to 37 by heating only active catalyst.

It will be obvious to those skilled in the art that various alterations and modifications in my heating apparatus may be made, as for example, increase in number of heating coil sections, variation in heating coil arrangement, in the number of control switches, etc., and yet remain within the intended scope of my invention. In addition, the application of my invention need not be limited to heating dehydrogenation catalysts or those promoting endothermic reactions, since it may be adapted to essentially any catalyst chamber to which it is necessary to supply extraneous heat. The switches, resistor wire, thermocouples, temperature recorders and controls may, and should preferably be standard and well tested equipment.

I claim:

1. A catalytic converter comprising in combination a chamber; a relatively electrically non-conducting catalyst material in the chamber, which material becomes electrically conducting upon use; a bare wire electrical element in contact with said catalyst; hollow non-conducting supports in said chamber for supporting said electrical element, and means including thermocouples inside certain of said non-conducting supports for measuring the temperature of said chamber, whereby upon said catalyst material becoming progressively more electrically conducting and progressively relatively shorting out said bare wire, said thermocouples are protected in said non-conducting supports from the resultant currents in said catalyst material.

2. A catalytic converter comprising in combination a chamber having an inlet and an outlet, a relatively electrically non-conducting catalyst material in the chamber; which material becomes electrically conducting upon use, an electrical heating element in contact with said catalyst; hollow non-conducting supports in said chamber supporting said electrical element, said electrical heating element, supported by said non-conducting supports, extending generally from a point nearer said inlet to a point nearer said outlet; a first electrical connection leading to said heating element at said point nearer said inlet; a second electrical connection leading to said heating element at said point nearer said outlet; a plurality of electrical connections leading to intermediate points on said heating element between said first and second connection; a controllable voltage power supply; switch means for connecting said first electrical connection and any one of said other electrical connections to opposite poles of said power supply; and means including thermocouples inside certain of said non-conducting supports for measuring the temperature of said catalyst, whereby as said catalyst becomes progressively more electrically conducting from said inlet toward said outlet and said heating element is progressively relatively shorted out the voltage may be varied and said electrical connections may be connected by said switch means in different ways whereby that portion of said chamber being heated may be maintained substantially at a predetermined temperature.

3. A catalytic converter comprising in combination a chamber having an inlet and an outlet; a relatively electrically non-conducting catalyst material in the chamber, which material becomes electrically conductive upon use; an electrical heating element in contact with said catalyst; hollow non-conducting supports in said chamber supporting said electrical element, said electrical heating element, supported by said non-conducting supports, extending generally from a point nearer said inlet to a point nearer said outlet; a first electrical connection leading to said heating element at said point nearer said inlet; a second electrical connection leading to said heating element at said point nearer said outlet; at least one electrical connection leading to an intermediate point on said heating element between said first and second connections; a power supply; switch means extending between said electrical connections and opposite poles of said power supply, whereby said electrical connections and said opposite poles are connected; and means including thermocouples inside certain of said non-conducting supports for measuring the temperature of said catalyst, whereby as said catalyst becomes progressively more electrically conducting from said inlet toward said outlet and said heating element is progressively relatively shorted out the voltage may be varied whereby that portion of said chamber being heated may be maintained substantially at a predetermined temperature.

HAROLD R. LEGATSKI.

REFERENCES CITED

The following references are of record in the file of this patent:

UNITED STATES PATENTS

| Number | Name | Date |
|---|---|---|
| 1,193,798 | Landis | Aug. 8, 1916 |
| 1,520,241 | Happe | Dec. 23, 1924 |
| 1,956,573 | Haslam | May 1, 1934 |
| 2,084,357 | Prickett | June 22, 1937 |
| 2,356,084 | Peck | Aug. 15, 1944 |

Certificate of Correction

March 1, 1949.

Patent No. 2,463,115.

HAROLD R. LEGATSKI

It is hereby certified that errors appear in the printed specification of the above numbered patent requiring correction as follows:

Column 4, line 74, after the syllable "let" strike out the comma and insert instead a semicolon; line 75, after the word "chamber" strike out the semicolon and insert instead a comma; column 5, line 1, after "use" strike out the comma and insert instead a semicolon; line 15, for "connection" read *connections*;

and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*